(12) United States Patent
Herbers

(10) Patent No.: US 10,981,612 B2
(45) Date of Patent: Apr. 20, 2021

(54) FLANGED MASTER TRACK PIN WITH RETAINING RING

(71) Applicant: Caterpillar Inc., Deerfield, IL (US)

(72) Inventor: Brice Herbers, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 269 days.

(21) Appl. No.: 16/108,180

(22) Filed: Aug. 22, 2018

(65) Prior Publication Data

US 2020/0062323 A1    Feb. 27, 2020

(51) Int. Cl.
*B62D 55/21*  (2006.01)
*B62D 55/06*  (2006.01)

(52) U.S. Cl.
CPC ............ *B62D 55/213* (2013.01); *B62D 55/06* (2013.01)

(58) Field of Classification Search
CPC .................................................. B62D 55/213
See application file for complete search history.

(56) References Cited

U.S. PATENT DOCUMENTS

| 4,265,084 A | 5/1981 | Livesay |
| 5,802,694 A * | 9/1998 | Myles ..................... B25B 27/30 29/240 |
| 6,926,460 B2 * | 8/2005 | Yamamoto ............. B62D 55/21 305/204 |
| 9,216,783 B2 | 12/2015 | Johannsen |
| 9,630,665 B2 * | 4/2017 | Kita ..................... B62D 55/213 |
| 2008/0265667 A1 | 10/2008 | Livesay |
| 2020/0324838 A1 * | 10/2020 | Calia ..................... B62D 55/32 |

FOREIGN PATENT DOCUMENTS

| JP | S55107492 U | 7/1980 |
| JP | S641078 U | 1/1989 |
| JP | 08295268 A | * 11/1996 |
| JP | 2014223831 A | * 12/2014 |
| JP | 2014223831 A | 12/2014 |

OTHER PUBLICATIONS

International Search Report and Written Opinion from PCT, International Application No. PCT/US2019/047147 dated Nov. 18, 2019.

* cited by examiner

*Primary Examiner* — Kip T Kotter
(74) *Attorney, Agent, or Firm* — Mark Hull

(57) ABSTRACT

A master link box for use with a link assembly of a work machine is disclosed. The master link box may include first and second master links with pin bores and lateral annular recesses disposed around the pin bores, a master link pin with a radial projection at a proximal end and a distal annular groove in the outer circumferential surface near the distal end, and a master retaining ring. The master link pin may be inserted through either master link until the radial projection of the master link pin abuts the lateral recess of one of the master links. The master retaining ring may be secured in the distal annular groove to prevent the master link pin from retracting through the master link box. The master retaining ring may be secured in the distal annular groove without press-fitting the master retaining ring.

20 Claims, 11 Drawing Sheets

FLANGED MASTER TRACK PIN WITH RETAINING RING

TECHNICAL FIELD

The present disclosure generally relates to a machine track and related assembly and disassembly strategies, and more specifically to a link pin that is receivable in machine track links to secure the tracks.

BACKGROUND

A variety of machine tracks have been used for construction, mining and agricultural machines, military vehicles, conveyors and torque transmitting devices for well over a century. In general terms, a machine track consists of an endless chain of track links coupled together and extending about rolling elements. In the case of ground engaging tracks, such as those used to propel mobile machines, a toothed rotating element, commonly known as a drive sprocket, is often used to rotate a track about one or more idlers and a plurality of track rollers supporting the weight of the machine. Such tracks are in widespread use, and have earned a place as indispensable components of many machines operating in rugged environments. The durability, utility and resultant commercial success of tracks used in track-type machines is in large part a result of many decades of research and engineering of their numerous specialized components. While many designs have proven well-suited to rugged off-road environments, where track-type machines typically operate, a drawback to virtually all viable track designs is the difficulty in disassembling or "breaking" the track for service, part replacement or machine disassembly.

One design utilizes pins to couple track links together to form sets of parallel endless track chains. In certain of these designs, a single pin couples together an inboard link and an outboard link in each of the parallel chains. Track shoes coupled with the respective chains provide the elements which engage the ground for propelling the machine. Press fits are often used to provide a robust connection between the pin and the associated track links. To disassemble most tracks having press fits, and particularly those having S-shaped links, a relatively large hydraulic press is typically required to press the pin out of the track. Even after removing the pin, seals used to retain lubricating fluid and protect components from entry of foreign material may resist further disassembly of the track, necessitating the use of an additional hydraulic press to complete track disassembly at a given joint. Great care is often required to avoid damaging the track components during disassembly. Tracks having straight links are often serviced by pulling outboard links off of the ends of track pins rather than pressing out the pins.

Due to the time, care and specialized tools required to disassemble machine track, it has become common to use master links in a track. While master links provide relatively easier disassembly of a track at a given joint, they often still require specialized tools and provide only a single point at which the track can be broken. Master links are also relatively extensively machined parts, and hence expensive, and in some instances can create a weak point in the track. Additionally, master links are generally only able to be fit into a track from one side of the track.

U.S. Pat. No. 9,630,665, titled "Crawler belt coupling apparatus," discloses a crawling belt coupling apparatus including first and second crawler belt links, a master pin, a locking pin, and a snap ring. However, this Patent cannot be assembled from either side of the continuous track and is not easy to assemble. Accordingly, a link pin is needed to which is both durable and easy to install in a link assembly.

The present disclosure is directed to one or more of the problems or shortcomings set forth above.

SUMMARY

In accordance with aspects of this disclosure, there are provided master link boxes for a continuous track of a work machine. The master link boxes include a left-hand master link having a first distal surface, a first proximal surface opposite the first distal surface, a first pin bore extending between the first distal surface and the first proximal surface, a first link seal bore, and a first lateral annular recess disposed around the first pin bore and inset from the first distal surface and a right-hand master link having a second distal surface, a second proximal surface opposite the second distal surface, a second pin bore extending between the second distal surface and the second proximal surface, a second link seal bore, and a second lateral annular recess disposed around the second pin bore and inset from the second distal surface. The master link boxes also include a master link pin having a distal end, a proximal end opposite the distal end, an outer circumferential surface, a distal annular groove in the outer circumferential surface near the distal end, and a radial flange near the proximal end. The master link boxes further include a master retaining ring disposed in the distal annular groove of the master link pin. When assembled, the master link pin extends through the first pin bore and the second pin bore, the radial flange abuts the first lateral annular recess and the distal annular groove is disposed distally beyond one of the first distal surface and second distal surface.

In accordance with other aspects, there are provided master link boxes for a continuous track of a work machine. The master link boxes include a left-hand master link having a first distal surface, a first proximal surface opposite the first distal surface, a first pin bore extending between the first distal surface and the first proximal surface, a first link seal bore, and a first lateral annular recess disposed around the first pin bore and inset from the first distal surface and a right-hand master link having a second distal surface, a second proximal surface opposite the second distal surface, a second pin bore extending between the second distal surface and the second proximal surface, a second link seal bore, and a second lateral annular recess disposed around the second pin bore and inset from the second distal surface. The master link boxes also include a master link pin receivable in the first pin bore and the second pin bore. The master link pin includes a distal end, a proximal end opposite the distal end, an outer circumferential surface, a distal annular groove in the outer circumferential surface near the distal end, and a radial projection near the proximal end having a projection surface extending outwardly from the outer circumferential surface. The master link boxes further include a master retaining ring disposed in the distal annular groove. To assemble the master link box, the master link pin is configured to be first inserted through either the left-hand master link or the right-hand master link and subsequently secured in place by the master retaining ring.

In accordance with other aspects, there are provided methods for forming a continuous track for a work machine. The methods include the steps of providing a plurality of track link boxes forming a link assembly having a first end and a second end and providing a master link box between the front end and the rear end of the link assembly. The master link box includes a left-hand master link having a first pin bore and a first link seal bore, a right-hand master link having a second pin bore and a second link seal bore, a master link bushing, a master link pin having a distal annular groove near a distal end and a radial projection near a proximal end, and a master retaining ring. The methods also include the steps of securing the first link seal bore and the second link seal bore to the first end of the link assembly, securing the master link bushing between two link seal bores of a track link box defining the second end of the link assembly, aligning the first pin bore and the second pin bore with the master link bushing, inserting the master link pin through one of the first pin bore and the second pin bore, through the master link bushing, and into the other of the first pin bore and second pin bore, and securing the master retaining ring in the distal annular groove of the master link pin.

BRIEF DESCRIPTION OF THE DRAWINGS

Further features and advantages of the invention will become apparent from the description of embodiments using the accompanying drawings. In the drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Figure 1:
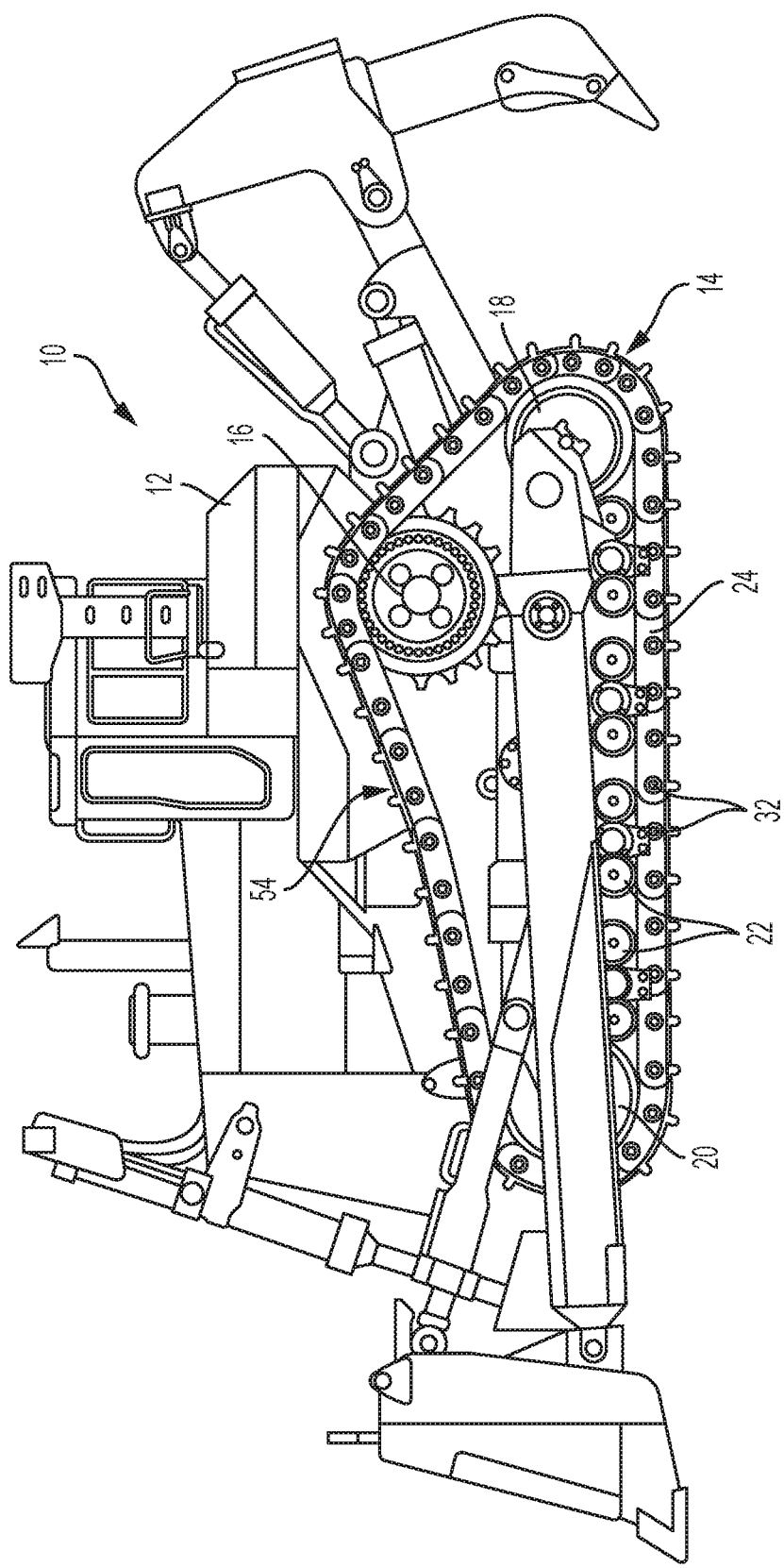
FIG. 1 is a side diagrammatic view of a machine according to one embodiment.

Referring to FIG. 1, there is shown a work machine 10 according to one embodiment. The work machine 10 may include a frame 12 and one or more tracks 14 coupled with frame 12. In the illustrated embodiment, the work machine 10 is a high drive track-type tractor, including a pair of identical tracks 14 identical to the first track 14 disposed on opposite side of the frame 12. However, it will be appreciated that the work machine 10 may be any other machine with a continuous track. For example, the work machine 10 may be a half-track machine, an excavator, a tank, some other type of mobile machine, or even a stationary machine such as a conveyor might be constructed according to the teachings set forth herein.

Figure 2:
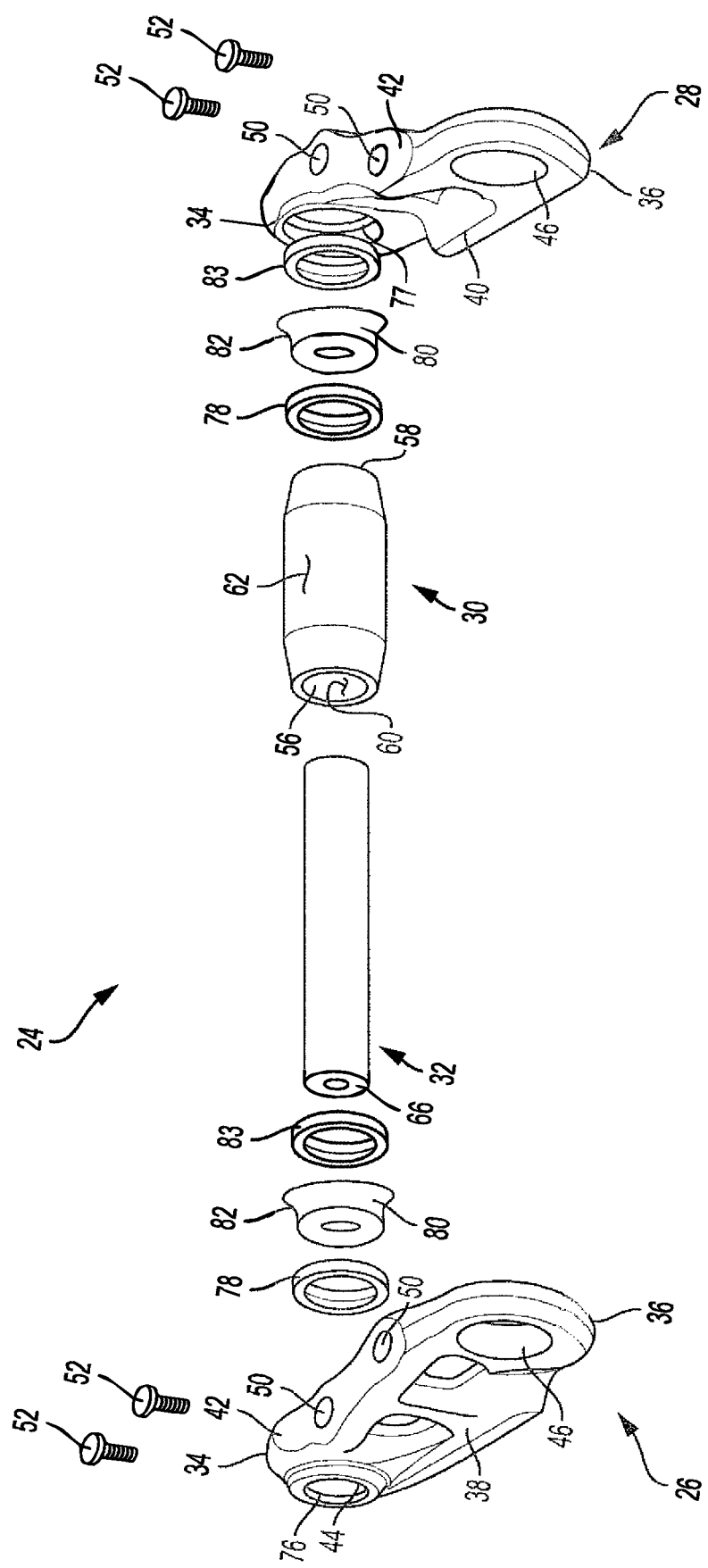
FIG. 2 is an exploded perspective view of a track link box.
Figure 3:
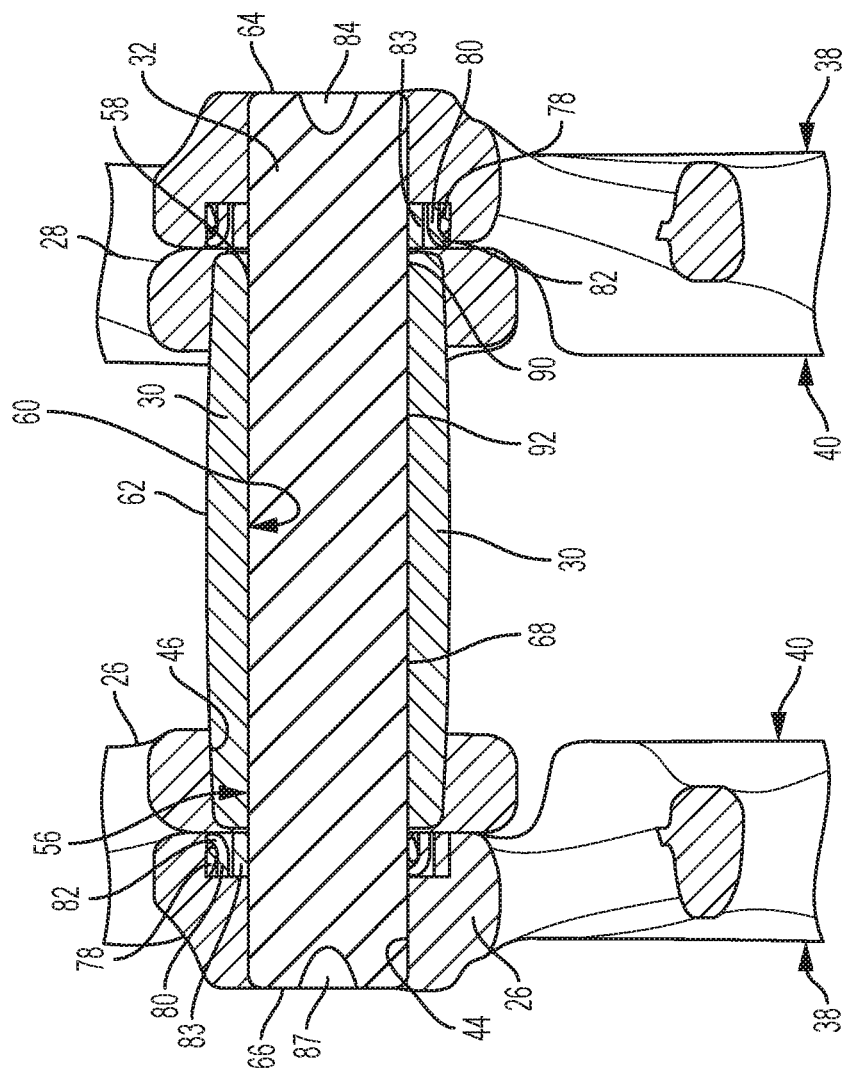
FIG. 3 is a cross-sectional view of track link box with a first exemplary track link pin.
Figure 4:
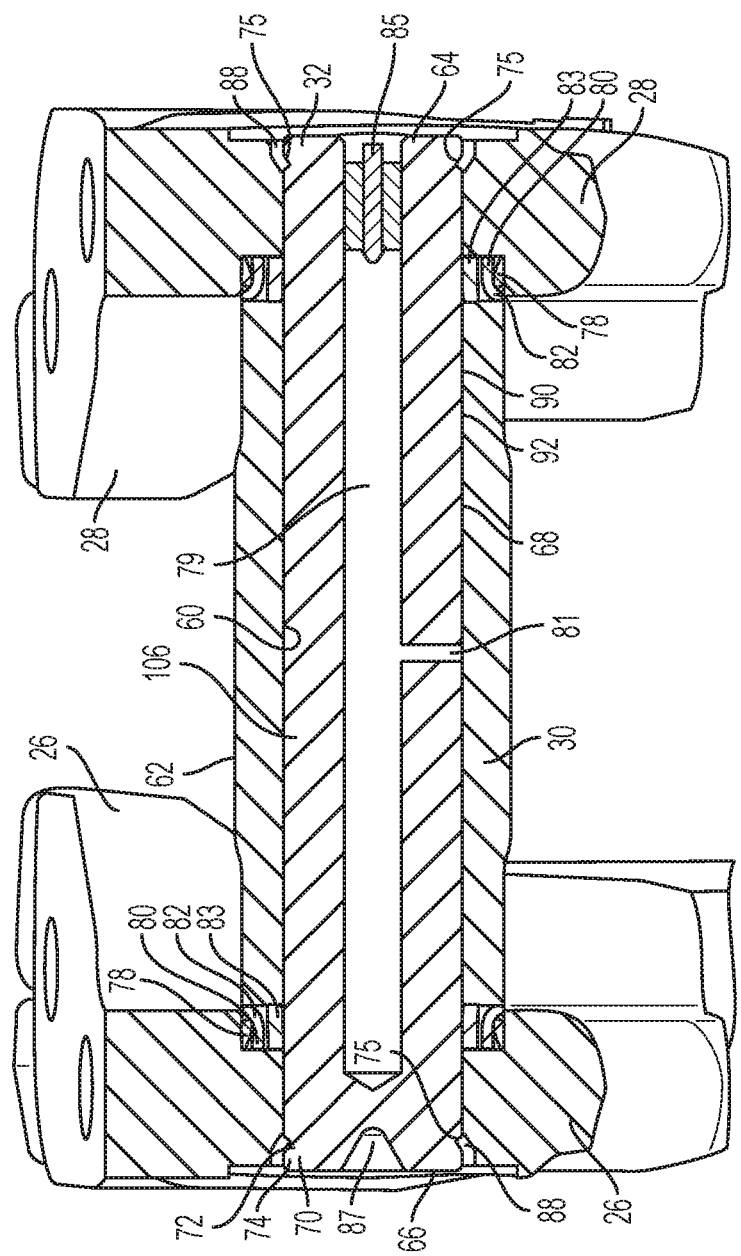
FIG. 4 is a cross-sectional view of track link box with a second exemplary track link pin.

Each track 14 may comprise an endless track extending about a plurality of rotatable elements, including for example a drive sprocket 16, a back idler 18 and a front idler 20, as well as a plurality of track rollers 22. The track 14 may further include a plurality of coupled together track link boxes 24 forming two parallel track chains, coupled with track shoes in a conventional manner. In FIGS. 2-4, an exemplary track link box 24 is shown including a first or left-hand track link 26, a second or right-hand track link 28, a bushing 30 disposed between the left-hand and right-hand track links 26, 28, and a track link pin 32 which may join the left-hand track link 26, bushing 30, and right-hand track link 28.

As shown in FIG. 2, the left-hand and right-hand track links 26, 28 are generally elongated ovals having a first end 34, a second end 36, a distal surface 38, a proximal surface 40, and a top surface 42. The track links 26, 28 may be substantially mirror images of one another and oriented substantially parallel to one another in the track link box 24. In one embodiment, the left-hand and right-hand track links 26, 28 are off-set links with the first ends 34 being flared or tapered distally outward and the second ends 36 being flared or tapered proximally inward from the remainder of each track link 26, 28. The first end 34 may flare outwardly and the second end 36 may flare inwardly to an extent such that the second ends 36 of one pair of track links 26, 28 may be disposed between the first ends 34 of an adjacent pair of track links 26, 28 when the adjacent link boxes 24 are aligned.

While the track links 26, 28 have been described as off-set links, the track links 26, 28 may take a variety of shapes and configurations. For example, the track links 26, 28 may be straight links with alternating pairs of inside and outside links, S-shaped links, or any other suitable configuration of links.

The track links 26, 28 may have a first or pin bore 44 extending through the first end 34 and a second or link seal bore 46 extending through the second end 36. The pin bore 44 may be a circular bore sized to receive a portion of the track link pin 32 and the link seal bore 46 may be a circular bore sized to receive a portion of the bushing 30. In a preferred embodiment, the pin bore 44 and link seal bore 46 are unthreaded.

The track links 26, 28 may also include one or more track shoe bores 50 disposed in the top surface 42 and extending partially into the track links 26, 28. The track shoe bores 50 are each threaded and sized to at least partially receive a track shoe fastener 52 to secure a track shoe 54 (FIG. 1) to the track links 26, 28. In a preferred embodiment, the track shoe fastener 52 is a threaded bolt which extends through the track shoe 54 and into the track shoe bores 50 to secure the track shoe 54 to the track links 26, 28.

As shown in FIGS. 2-4, the bushing 30 is a generally hollow cylinder having a first opening 56, a second opening 58 opposite the first opening (not shown), a cylindrical inner surface 60, and a cylindrical outer surface 62. The cylindrical outer surface 62 may be tapered radially inward near the first and second openings 56, 58 such that the ends of the bushing 30 may be securely received within the link seal bores 46 of the track links 26, 28. The cylindrical inner surface 60 defines a bore having an inner diameter which may be sized to receive the track link pin 32 and allow the track link pin 32 to rotate within the cylindrical inner surface 60. While the cylindrical outer surface 62 is illustrated as being tapered, the bushing 30 may have other designs. For example, the cylindrical outer surface 62 may have a stepped outer diameter wherein the cylindrical outer surface 62 has a first diameter that is constant along the length of the bushing 30 near the first and second openings 56, 58 and a second diameter that is constant along the length of the bushing 30 between the portions having the first diameter, or any other suitable geometry.

Referring to FIGS. 2-4, the track link pin 32 is a substantially cylindrical rod having a distal end 64, a proximal end 66, and an outer circumferential surface 68. The track link pin 32 is sized and shaped to be at least partially inserted through the pin bores 44 of the track links 26, 28 and through the cylindrical inner surface 60 of the bushing 30.

As shown in FIG. 4, the track link pin 32 may have a flared end or radial flange or projection 70 projecting radially outward from the outer circumferential surface 68 at or near the proximal end 66. The radial projection 70 has a projection surface 72 extending outwardly from the outer circumferential surface 68 and a radial outer surface 74 substantially concentric with the outer circumferential surface 68 and extending between the projection surface 72 and the proximal end 66.

Turning back to FIG. 2, the track links 26, 28 may include a lateral annular recess 76 disposed around the pin bores 44 and inset from the distal surface 38 and a medial annular recess 77 disposed around the pin bores 44 and inset from the proximal surface 40. The lateral annular recess 76 may be sized to receive the radial projection 70 of the track link pin 32, as detailed below. The lateral annular recess 76 may be substantially the same width or slightly larger than the radial projection 70 and the lateral annular recess 76 may be inset from the distal surface 38 to substantially the same depth as the length of the radial projection 70 extending between the projection surface 72 and the proximal end 66. The medial annular recess 77 may be sized to partially receive the bushing 30. The medial annular recess 77 may be substantially the same width or slightly larger than the cylindrical outer surface 62 of the bushing 30 near the first and/or second opening 56, 58 of the bushing 30. The medial annular recess 77 may also be recessed from the proximal surface 40 such that a load ring 78, a seal ring 80 having a seal lip 82, and a thrust ring 83 may be disposed between the bushing 30 and each of the track link 26, 28 when the track link box 24 is assembled, as detailed below. While the medial annular recess 77 has been as being recessed such that the track link box 24 may include a load ring 78, a seal ring 80, and a thrust ring 83, it will be appreciated that other seals, rings, or seal rings, or any combination thereof, may be utilized. For example, the medial annular recess 77 may be recessed such that the track link box 24 may include a thrust ring and an oil seal, a grease seal, or any other suitable seals or seal rings.

As shown in FIG. 4, the track link pin 32 may include one or more annular grooves 75 in the outer circumferential surface 68 near the distal and/or proximal ends 64, 66. The annular grooves 75 may be recessed from the outer circumferential surface 68. In the illustrated embodiment, the annular grooves 75 are rounded. However, it will be appreciated that other embodiments are contemplated. For example, the annular grooves 75 may be triangular, rectangular, or any other suitable design.

The track link box 24 may also include one or more retaining rings 88 disposed in the annular grooves 75 of the track link pin 32. The retaining rings 88 may be disc-shaped and sized to securely fit in the annular grooves 75 of the track link pin 32. The retaining rings 88 may be larger than the pin bores 44 of the track links 26, 28. When the track link pin 32 is inserted in the track link box 24, the retaining rings 88 may be disposed in the annular grooves 75 of the track link pin 32 to retain the track link pin 32 in the track link box 24. In a preferred embodiment, the retaining rings 88 are press fit into the annular grooves 75.

As shown in FIG. 4, the track link pin 32 may include a longitudinal bore 79 extending longitudinally into the track link pin 32 from the distal end 64 and a side fluid passage 81 extending radially outward from the longitudinal bore 79 to the outer circumferential surface 68. As such, the outer circumferential surface 68, the side fluid passage 81, the longitudinal bore 79, and the distal end 64 of the track link pin 32 may be fluidly connected. The track link pin 32 may also include a cap 85 which may be inserted into the longitudinal bore 79 from the distal end 64 to close off or otherwise seal the longitudinal bore 79 from the distal end 64. In one embodiment, the cap 85 is a screw or other fastener which may be threaded or otherwise secured in the longitudinal bore 79 from the distal end 64 to seal off the longitudinal bore 79.

While the track link pin 32 has been described as having one or more annular grooves 75 which may receive a retaining ring 88, a longitudinal bore 79, a side fluid passage 81, and a cap 85, other embodiments may be contemplated. For example, if grease is used as a lubricant within the track link box 24, as detailed below, the track link pin 32 may have a substantially smooth outer circumferential surface 68 without annular grooves 75 and the track link box 24 may not include retaining rings 88 to secure the track link pin 32 in the track link box 24. Also, if grease is used as a lubricant within the track link box 24, the track link pin 32 may be a substantially solid rod without any internal passages or bores or a cap.

As shown in FIG. 3-4, the track link pin 32 may also include a first counterbore 84 disposed in the distal end 64 and/or a second counterbore 87 disposed in the proximal end 66. The first and second counterbores 84, 87 may extend partially into the track link pin 32 and may make the track link pin 32 easier to assemble and/or may prevent dirt or other debris from collecting in the track link box 24. In the illustrated embodiment, the first and second counterbores 84, 87 are relatively conical. However, it will be appreciated that other embodiments are contemplated. For example, the first and/or second counterbores 84, 87 may be rounded, triangular, rectangular, pentagonal, or any other suitable shape.

While the track link pin 32 has been described as having a first counterbore 84 disposed in the distal end 64, it will be appreciated that other embodiments are contemplated. For example, if the track link pin 32 includes a longitudinal bore 79, a side fluid passage 81, and a cap 85, the track link pin 32 may not have a first counterbore 84 disposed in the distal end 64.

Figure 5:
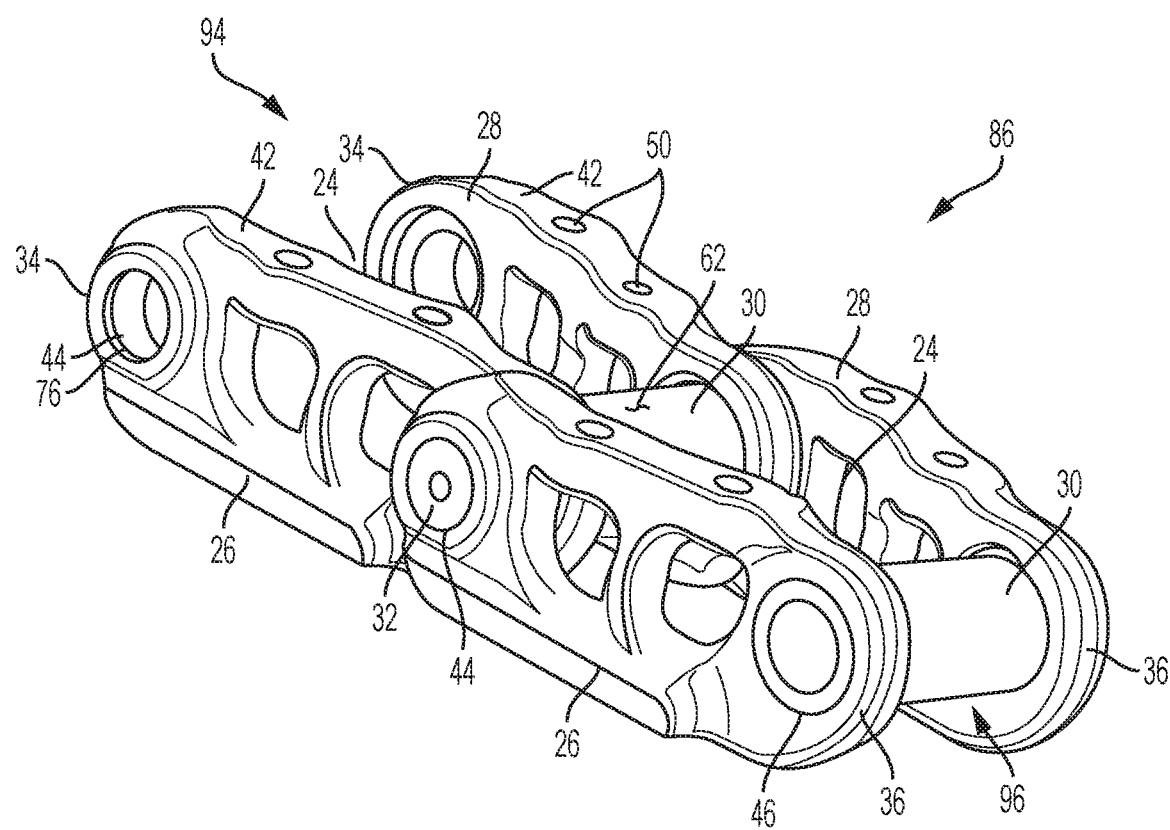
FIG. 5 is a perspective view of a link assembly.

Referring to FIGS. 3-5, a first or inside pair of track links 26, 28 may be joined to a second or outside pair of track links 26, 28 to form a link assembly 86. The link seal bores 46 of the first or inside pair of track links 26, 28 may be fittingly secured to the cylindrical outer surface 62 of the bushing 30 at or near the first and second openings 56, 58 of the bushing 30. The link seal bores 46 may be press fit onto the bushing 30 by use of a tool or machine, such as a hydraulic press. However, the link seal bores 46 of the track links 26, 28 may be secured or otherwise attached to the bushing 30 by any other suitable means.

The pin bores 44 of the second or outside pair of track links 26, 28 may then be aligned with the first and second openings 56, 58 of the bushing 30 and/or the link seal bores 46 of the first pair of track links 26, 28. The track link pin 32 may then be inserted through the pin bore 44 of either the left-hand or right-hand track link 26, 28 of the outside pair, through the bushing 30, and into the pin bore 44 of the other track link 26, 28 of the outside pair. The track link pin 32 may be inserted through the pin bores 44 and the bushing 30 until the projection surface 72 of the track link pin 32 abuts the annular recess 76 of the track link 26, 28 through which the track link pin 32 was first inserted. The track link pin 32 may be press-fit into the pin bores 44 and bushing 30 by use of a tool or machine, such as a hydraulic press. However, the track link pin 32 may be secured or otherwise inserted through the pin bores 44 and the bushing 30 by any other suitable means. The track link pin 32 may secured, if at all, only to the pin bores 44 of the outside pair of track links 26, 28 such that the track link pin 32 and the outside pair of track links 26, 28 secured to the track link pin 32 may rotate independently from the bushing 30 and the inside pair track links 26, 28 secured to the bushing 30 about an axis extending through the track link pin 32. Once the track link boxes 24 are secured to an adjacent track link box 24, track shoes 54 may be secured to the top surface 42 of the track links 26, 28 by inserting the one or more track shoe fasteners 52 through the track shoe 54 and into the one or more track shoe bores 50.

As shown in FIGS. 3-5, the link seal bores 46 of the first pair or inside pair of track links 26, 28, the ends of the bushing 30, the load rings 78, the seal rings 80, the thrust rings 83, and the outer circumferential surface 68 of the track link pin 32 may form a fluid seal when the track link pin 32 is inserted through the link seal bores 46 and the bushing 30. The load ring 78 may provide a thrust load or similar force onto the seal ring 80 which pushes or presses the seal lip 82 of the seal ring 80 against the end of the bushing 30 to form a fluid seal between the bushing 30 and the track links 26, 28. The thrust ring 83 separates the bushing 30 and the medial annular recess 77 of the track links 26, 28 to protect the load ring 78 and seal ring 80. As a result, when the track link pin 32 is inserted in the track link box 24, a sealed link cavity 90 is formed between the cylindrical inner surface 60 of the bushing 30, the outer circumferential surface 68 of the track link pin 32, the load rings 78, the seal rings 80, and the thrust rings 83. While the track link box 24 has been described as having load rings 78, seal rings 80, and thrust rings 83 which form the sealed link cavity 90, it will be appreciated that other seals, rings, and seal rings or combinations thereof may be used to form the sealed link cavity 90. For example, the track link box 24 may use a thrust ring and an oil seal, such as when the track link pin 32 includes a longitudinal bore 79, a grease seal, such as when the track link pin 32 does not include a longitudinal bore 79, or any other suitable seals, rings, or seal rings, or any combination thereof.

Before the track link pin 32 is fitted into the pin bores 44 and bushing 30, a lubricant 92, such as grease, oil, or any other suitable lubricant, may be inserted into the sealed link cavity 90 to facilitate the rotation of the track link pin 32 within the bushing 30, reduce friction and/or wear of the bushing 30 and/or track link pin 32, and reduce heat generation.

In a first embodiment, the lubricant 92 may be inserted into the sealed link cavity 90 and/or the bushing 30 before the track link pin 32 is inserted into the track link box 24 or after the track link pin 32 has been partially inserted into the track link box 24 but before the track link pin 32 is fully inserted into the track link box 24. As such, when the track link pin 32 is fully inserted in the track link box 24, the lubricant 92 will be fluidly sealed within the sealed link cavity 90 of the track link box 24.

In a second embodiment where the track link pin has a longitudinal bore 79 and side fluid passage 81 (FIG. 4), such as when the lubricant 92 is oil, the lubricant 92 may be inserted into the longitudinal bore 79 of the track link pin 32 after the track link pin 32 has been inserted into the track link box 24 such that the lubricant 92 flows through the side fluid passage 81 and into the sealed link cavity 90. After a sufficient amount of lubricant 92 has been added into the sealed link cavity 90, the cap 85 may be inserted into the longitudinal bore 79 to seal the longitudinal bore 79 and thereby retain the lubricant 92 in the sealed link cavity 90.

After the track link pin 32 has been inserted through the pin bore 44 of one of the track links 26, 28, the bushing 30, and the other track link 26, 28, retaining rings 88 may be secured into the annular grooves 75 of the track link pin 32 through which the distal end 64 of the track link pin 32 extends. As the retaining rings 88 are larger than the pin bores 44 of the track links 26, 28, the retaining rings 88, when secured in the annular groove 75, will prevent the distal end 64 of the track link pin 32 from being retracted through the pin bore 44 of the track link 26, 28 through which the distal end 64 of the track link pin 32 extends. In such a manner, the retaining ring 88 may secure the track link pin 32 in the track link box 24.

The process of joining track links 26, 28 together to form the link assembly 86 may be repeated using additional pairs of track links 26, 28, bushings 30, and track link pins 32 until the link assembly 86 is substantially the length of the continuous track 14. In a preferred embodiment, the process is repeated until the link assembly 86 is just one track link box 24 short of the desired length of the continuous track 14.

The resulting link assembly 86 is a substantially straight chain of link boxes 24 and has a first or front end 94 and a second or rear end 96. In a preferred embodiment, the front end 94 of the link assembly 86 consists of the first ends 34 of the track links 26, 28 of the front link box 24 such that the pin bores 44 of the front track links 26, 28 are exposed and the rear end 96 of the link assembly 86 consists of the second ends 36 of the track links 26, 28 of the rear link box 24 such that link seal bores 46 of the rear track links 26, 28 are fit together and may be aligned and joined with the pin bores 44 of subsequent track links 26, 28. It will be appreciated that the terms front end and rear end in relation to the link assembly 86 are descriptions used to clarify the illustrations and the front end 94 of the link assembly 86 may be disposed at the rear of the link assembly 86 and the rear end 96 of the link assembly 86 may be disposed at the front of the link assembly 86.

Figure 6:
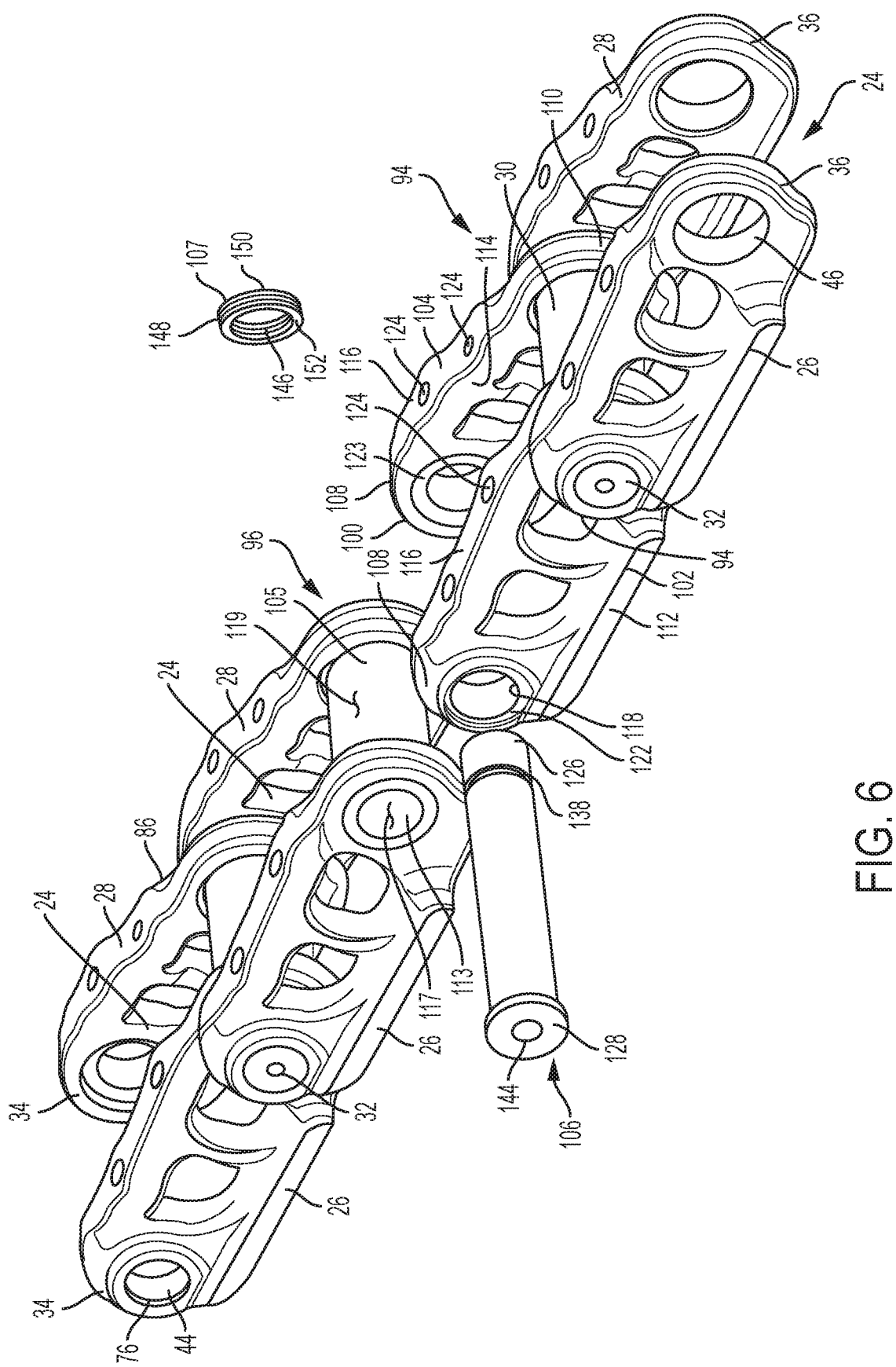
FIG. 6 is a perspective view of an exemplary master link box joined to a front end of a link assembly.
Figure 7:
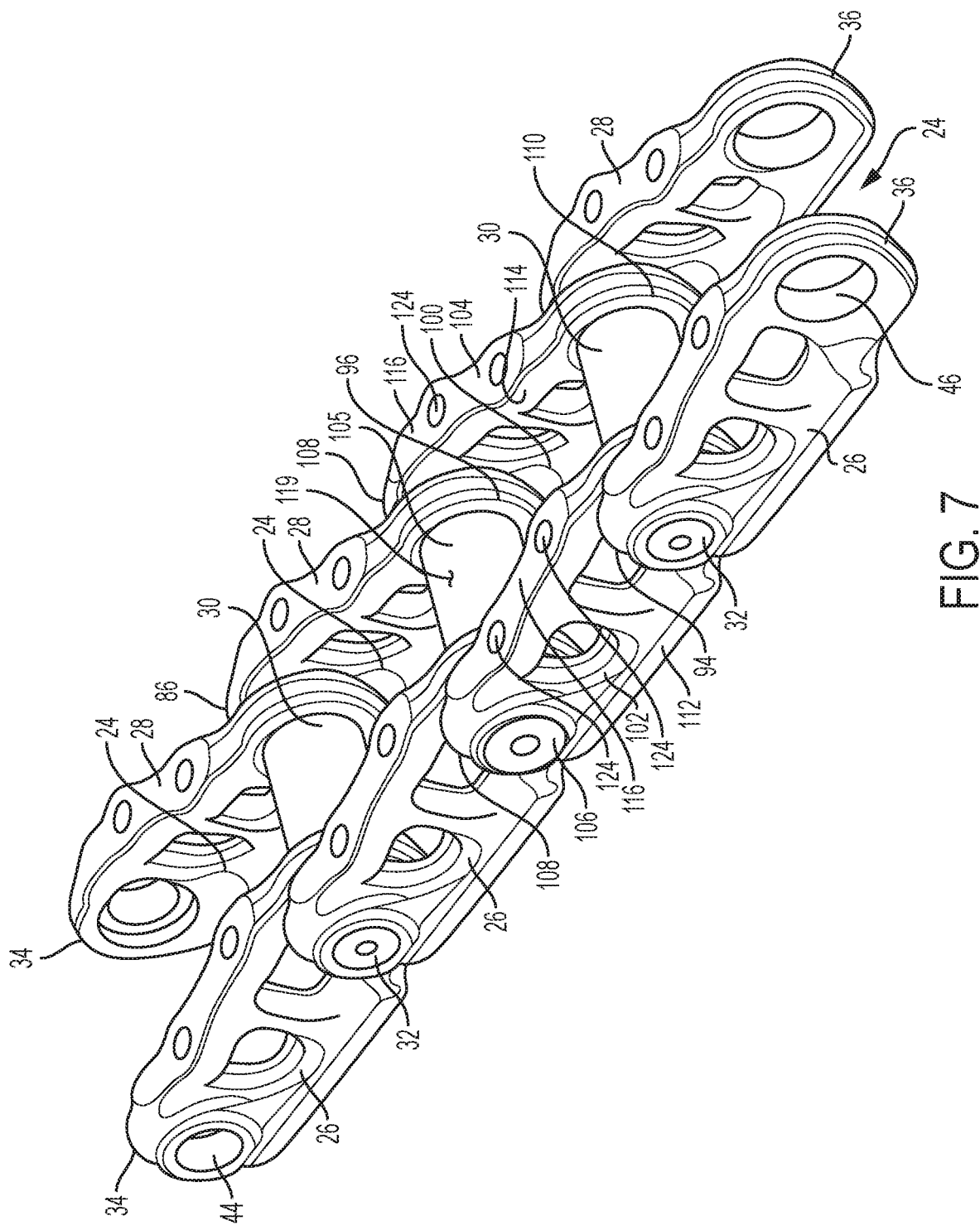
FIG. 7 is a perspective view of an exemplary master link box joining the front and rear ends of a link assembly.

Turning now to FIGS. 6 and 7, a master link box 100 may be joined to the front and rear ends 94, 96 of the link assembly 86 to form a continuous track 14. The master link box 100 may include a first or left-hand master link 102, a second or right-hand master link 104, a master link bushing 105, a master link pin 106, and a master retaining ring 107.

As shown in FIGS. 6 and 7, the master links 102, 104 are similar in size and shape to the track links 26, 28. Similarly to the track links 26, 28, the master links 102, 104 each have a first end 108 that is flared outwardly, a second end 110 that is flared inwardly, a distal surface 112, a proximal surface 114, a top surface 116, a pin bore 118 extending through the first end 108, a link seal bore 120 (not shown) extending through the second end 110, a lateral annular recess 122 disposed around the pin bore 118 and inset from the distal surface 112, a medial annular recess 123 disposed around the pin bore 118 and inset from the proximal surface 114, and at least one track shoe bore 124 in the top surface 116. The at least one track shoe bores 124 in the top surface 116 may extend partially into the master links 102, 104 which may receive the track shoe fasteners 52 (FIG. 2) to secure the track shoe 54 (FIG. 1) to the master link box 100. In a preferred embodiment, the continuous track 14 consists of a plurality of track link boxes 24 and a master link box 100. However, it will be appreciated that other embodiments are contemplated. For example, the master links 102, 104 may be used instead of the track links 26, 28 in the remainder of the link assembly 86 or the link assembly 86 may be any other combination of track link boxes 24 and master link boxes 100.

In the illustrated embodiment, the lateral annular recess 122 has a diameter between about 56.4 millimeters and about 57.6 millimeters, such as between about 56.8 millimeters and about 57.2 millimeters, such as about 57.0 millimeters. The pin bores 118 have a diameter between about 45.5 millimeters and about 46.0 millimeters, such as about 45.7 millimeters.

As shown in FIGS. 6-9 and 12, the master link bushing 105 may be a generally hollow cylinder having a first opening 113, a second opening 115 (not shown) disposed opposite the first opening 113, a cylindrical inner surface 117, and a cylindrical outer surface 119. The cylindrical inner surface 117 may be a substantially smooth bore and the cylindrical outer surface 119 may be tapered radially inward near the first and second openings 113, 115 such that the ends of the master link bushing 105 may be securely received within the link seal bores 46 of the track links 26, 28 defining the rear end 96 of the link assembly 86, as detailed below. The cylindrical inner surface 117 defines a bore having an inner diameter which may be sized to receive the master link pin 106 and allow the master link pin 106 to rotate within the cylindrical inner surface 117. While the cylindrical outer surface 119 is illustrated as being tapered, other shapes are contemplated. For example, the cylindrical outer surface 119 may have a stepped outer diameter wherein the cylindrical outer surface 119 has a first diameter that is constant along the length of the master link busing 105 near the first and second openings 113, 115 and a second diameter that is constant along the length of the master link bushing 105 between the portions having the first diameter, or any other suitable geometry.

The master link bushing 105 of the master link box 100 may be substantially the same as the bushing 30 of the track link boxes 24. However, the master link bushing 105 of the master link box 100 may be different than the bushings 30 of the track link boxes 24.

Referring to FIGS. 6-12, the master link pin 106 is a generally cylindrical rod having a distal end 126, a proximal end 128, and an outer circumferential surface 130. The distal and proximal ends 126, 128 may be substantially circular and flat, and the proximal end 128 may be radially larger than the outer circumferential surface 130. The master link pin 106 may have a radial flange or projection 132 extending radially outward from the outer circumferential surface 130 near the proximal end 128 which includes a projection surface 134 extending outwardly from the outer circumferential surface 130 and a radial outer surface 136 substantially concentric with the outer circumferential surface 130 and extending between the projection surface 134 and the proximal end 128. In the illustrated embodiment, the projection surface 134 is perpendicular to the outer circumferential surface 130. However, it will be appreciated that other embodiments are contemplated. For example, the projection surface 134 may be angled toward the proximal end 128, angled toward the distal end 126, rounded, or any other suitable shape which may abut the master links 102, 104 to prevent the master link pin 106 from being inserted too far through the master link box 100, as detailed below. In one embodiment, the outer circumferential surface 130 is filleted, tapered, otherwise shaped near the distal end 126 to facilitate the insertion of the master link pin 106 to be placed into and through the pin bores 118 of the first and second master links 102, 104 and the master link bushing 105, as detailed below.

The master link pin 106 also includes a distal annular groove 138 disposed in and extending circumferentially around the outer circumferential surface 130 near the distal end 126. The distal annular groove 138 is disposed a distance from the radial projection 132 that generally corresponds to the length between the lateral annular recesses 122 of the master links 102, 104 when the master links 102, 104 are arranged in the master link box 100, as detailed below. The distal annular groove 138 may be recessed from the outer circumferential surface 130 and sized and shaped to receive the master retaining ring 107 or other securement member to secure the master link pin 106 in the master link box 100. In the illustrated embodiment, the distal annular groove 138 is rectangular. However, it will be appreciated that the distal annular groove 138 may be other shapes. For example, the distal annular groove 138 may be rounded, triangular, oval, or any other suitable shape.

Figure 8:
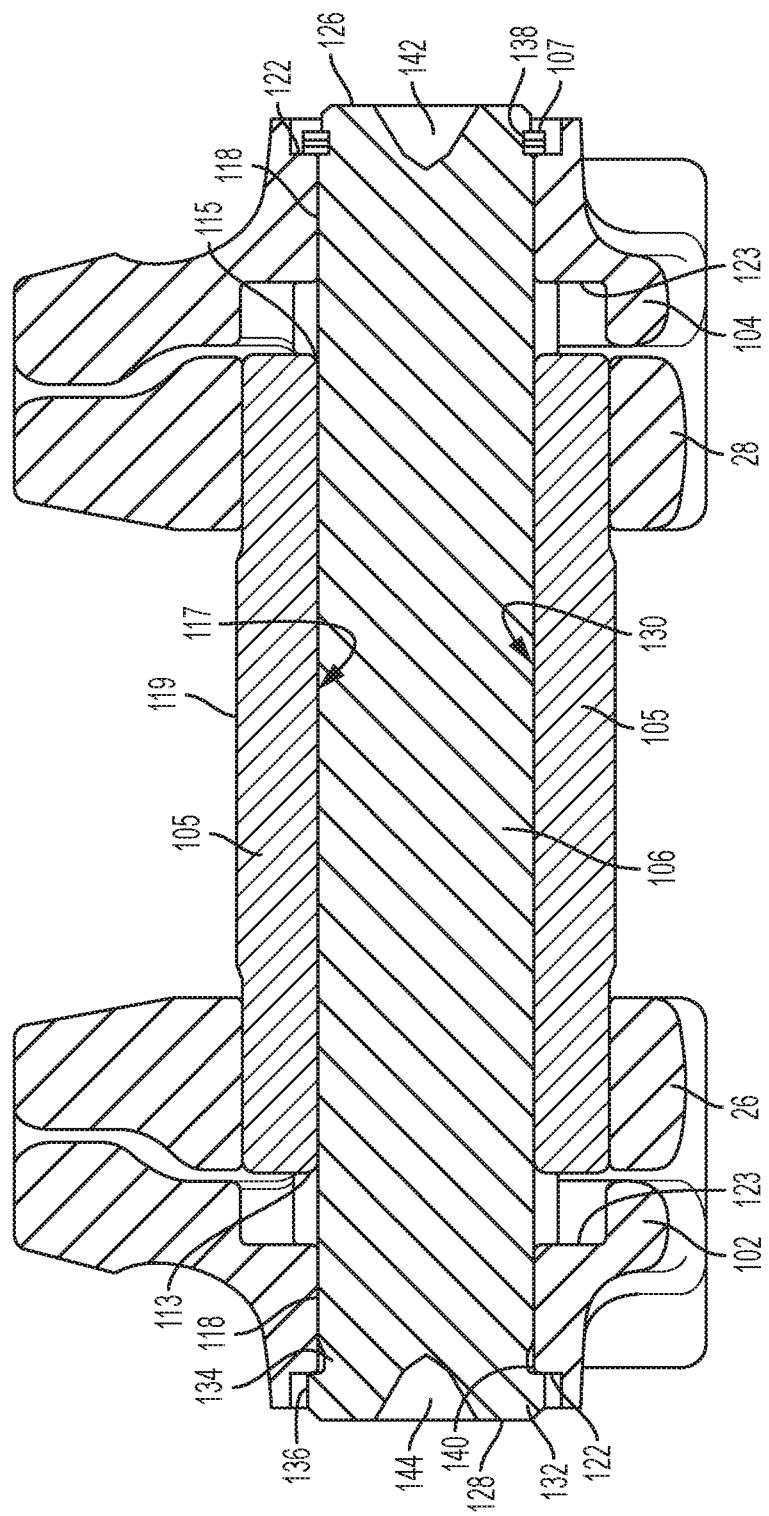
FIG. 8 is a cross-sectional view of a first exemplary master link box.
Figure 9:
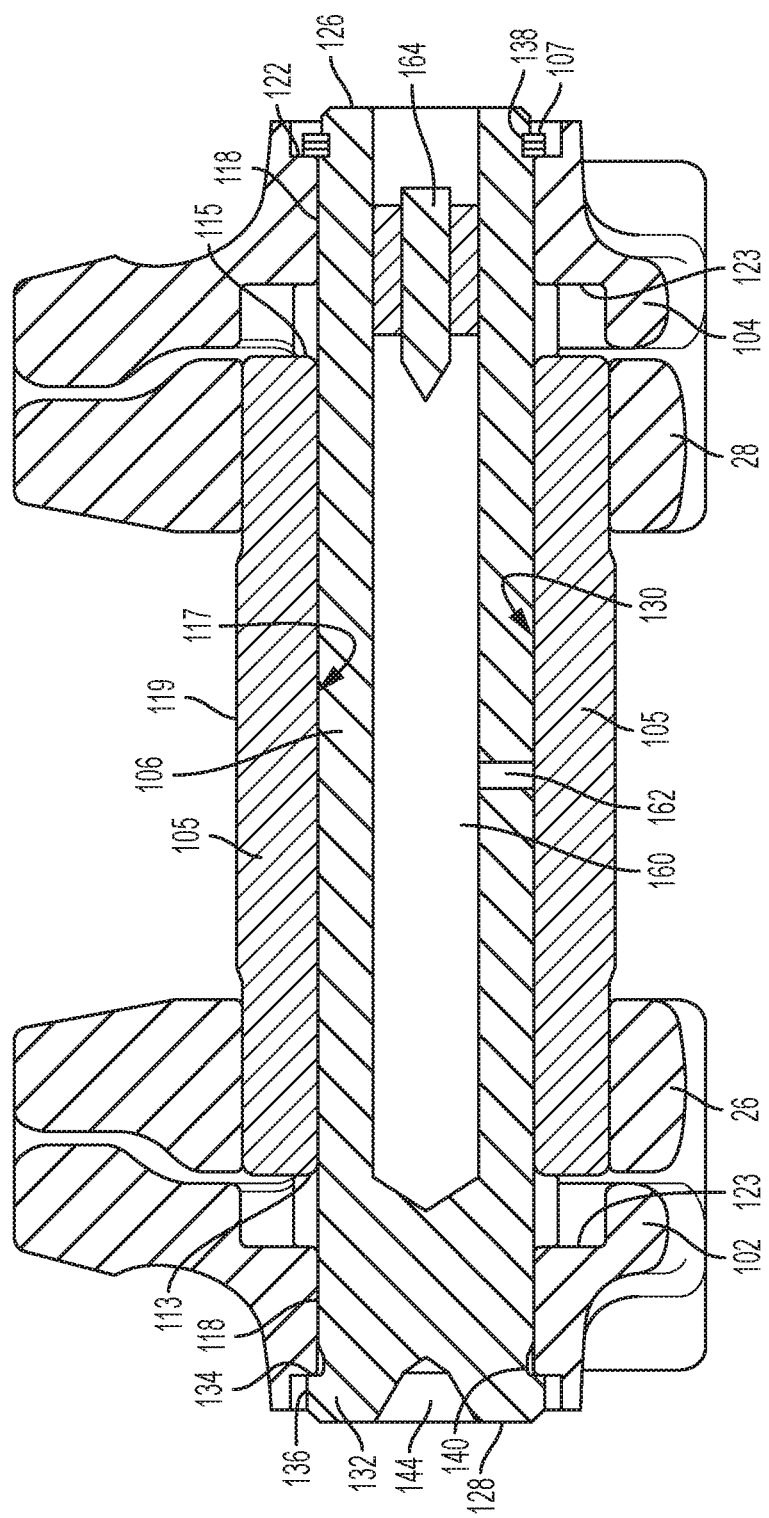
FIG. 9 is a cross-sectional view of a second exemplary master link box.
Figure 10:
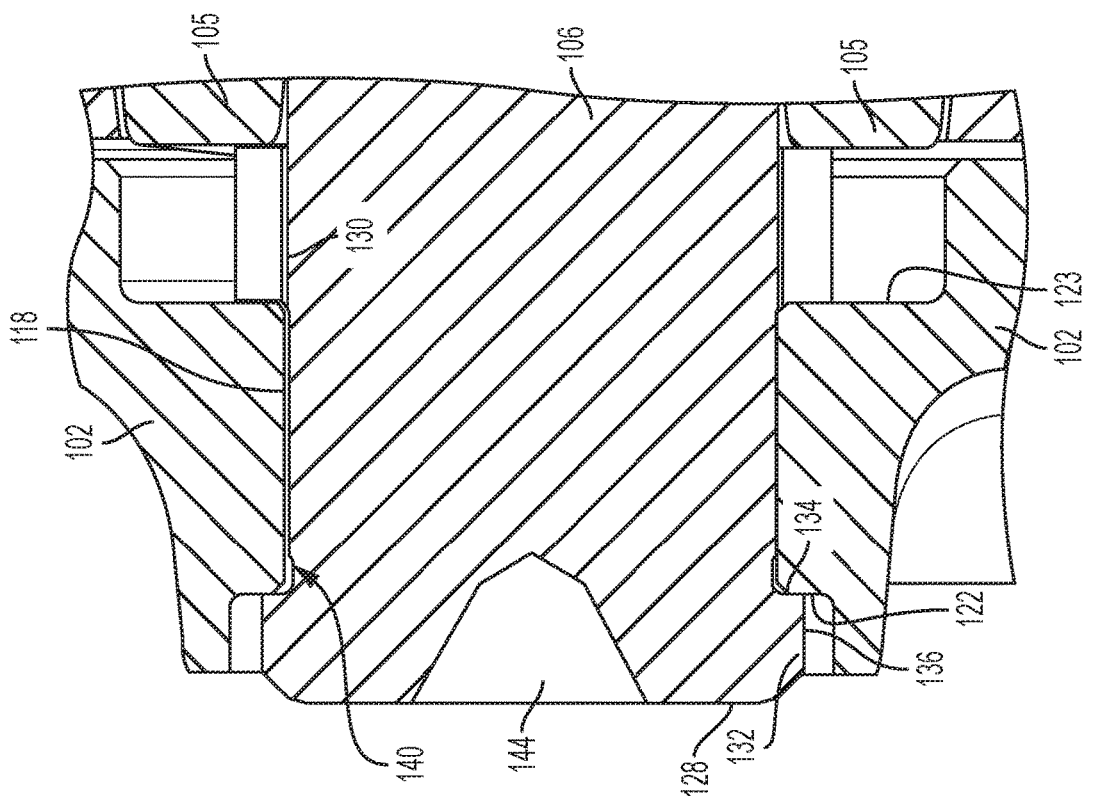

As shown in FIGS. 8-10, the master link pin 106 may also include a proximal annular groove 140 disposed in and extending circumferentially around the outer circumferential surface 130 near the proximal end 128 and/or the radial projection 132. The proximal annular groove 140 may be recessed from the outer circumferential surface 130 to reduce the stress concentration on the master link pin 106 near the projection surface 134 when the master link pin 106 is inserted in the master link box 100 and the projection surface 134 abuts the lateral annular recess 122 of one of the master links 102, 104, as detailed below. The proximal annular groove 140 may also increases the ease of manufacture and assembly of the master link box 100. In the illustrated embodiment, the proximal annular groove 140 is substantially rectangular with rounded corners and the wall of the proximal annular groove 140 nearest the proximal end 128 may form a part of or be coextensive with the projection surface 134 of the radial projection 132. However, it will be appreciated that the distal annular groove 138 may have other designs. For example, the distal annular groove 140 may be rectangular, oval, triangular, elliptical, or any other suitable shape.

Referring back to FIGS. 6-12, the distal portion of the master link pin 106 near the distal end 126 may be radially tapered or narrowed to facilitate the placement of the master link pin 106 through the pin bores 118 of the master links 102, 104 and the master link bushing 105. In the illustrated embodiment, the outer circumferential surface 130 between the distal annular groove 138 and the distal end 126 is concentric with and has a smaller diameter than portion of the outer circumferential surface 130 between the distal annular groove 138 and the proximal annular groove 140. However, the radial surface of the master link pin 106 near the distal end 126 may have other designs. For example, the outer circumferential surface 130 between the distal annular groove 138 and the distal end 126 may be tapered, angled, or rounded.

As shown in FIGS. 8, 9, 11, and 12, the master link pin 106 may include a distal counterbore 142 disposed in the distal end 126 of the master link pin 106. The distal counterbore 142 may extend from approximately the middle of the distal end 126 toward the proximal end 128 of the master link pin 106 to a depth substantially equivalent to or slightly further than the edge of the distal annular groove 138 closest to the proximal end 128. The distal counterbore 142 may prevent dirt and other debris from accumulating in and around the distal annular groove 138 and thereby protects the distal annular groove 138 and the master retaining ring 107 disposed therein, as detailed below.

In the illustrated embodiment, the distal counterbore 142 is substantially conical with a first conical portion having a greater incline and extending farther into the master link pin 106 and a second conical portion having a lesser incline and extending only slightly farther into the master link pin 106 than the first conical portion. However, the distal counterbore 142 may have other designs. For example, the distal counterbore 142 may be rectangular, circular, rounded, triangular, curved, cylindrical, rectangular, hexagonal or any other suitable shape.

As shown in FIGS. 6, 8, 9, 11, and 12, the master link pin 106 may also include a proximal counterbore 144 disposed in the proximal end 128 of the master link pin 106. The proximal counterbore 144 may extend from approximately the middle of the proximal end 128 toward the distal end 126 of the master link pin 106 to a depth substantially equivalent to or slightly further than edge of the proximal annular groove 140 closest to the distal end 126. The proximal counterbore 144 prevents dirt and other debris from accumulating in the lateral annular recess 122 of the master link 102, 104 and between the master link 102, 104, the outer circumferential surface 130, and the radial projection 132 of the master link pin 106, and thereby protects the pin bores 118 of the master links 102, 104 and the radial projection 132 of the master link pin 106. The proximal counterbore 144 may also facilitates the placement of the master link pin 106 in the master link box 100 from either side of the master link box 100, as detailed below.

In the illustrated embodiment, the proximal counterbore 144 is substantially a mirror image of the distal counterbore 142. However, it will be appreciated that other embodiments are contemplated. For example, the proximal counterbore 144 may be rectangular, circular, rounded, triangular, curved, cylindrical, or any other suitable shape.

As shown in FIG. 9, the master link pin 106 may include a longitudinal bore 160 extending longitudinally into the master link pin 106 from the distal end 126 and a side fluid passage 162 extending radially outward from the longitudinal bore 160 to the outer circumferential surface 130. As such, the outer circumferential surface 130, the side fluid passage 162, the longitudinal bore 160, and the distal end 126 of the master link pin 106 may be fluidly connected. The master link pin 106 may also include a cap 164 which may be inserted into the longitudinal bore 160 from the distal end 126 to close off or otherwise seal the longitudinal bore 160 from the distal end 126. In a preferred embodiment, the cap 164 is a screw or other fastener which may be threaded or otherwise secured in the longitudinal bore 160 from the distal end 126 to seal off the longitudinal bore 160.

While the master link pin 106 has been described as having a distal counterbore 142 disposed in the distal end 126, it will be appreciated that other embodiments are contemplated. For example, if the master link pin 106 includes a longitudinal bore 160, a side fluid passage 162, and a cap 164, the master link pin 106 may not have a distal counterbore 142 disposed in the distal end 126.

In the illustrated embodiments, the master link pin 106 has a length extending between the distal and proximal ends 126, 128 between about 244.5 millimeters and about 246.5 millimeters, such as between about 250.0 and about 246.0 millimeters, such as about 245.5 millimeters, and a diameter of the outer circumferential surface 130 between about 45.90 and about 45.95 millimeters, such as between about 45.907 millimeters and about 45.933 millimeters, such as about 45.92 millimeters. The distal annular groove 138 of the link pin is about 2.77 millimeters and has a length between about 3.20 millimeters and about 3.46 millimeters, such as about 3.32 millimeters. The radial projection 132 of the master link pin 106 has an outer diameter between about 49.0 millimeters and about 50.0 millimeters, such as about 49.5 millimeters. The distal annular groove 138 is between 225.11 millimeters and about 225.37 millimeters, such as about 225.24 millimeters, from the radial projection 132. The proximal annular groove 140 has a length between about 2.5 millimeters and about 3.5, such as about 3.0 millimeters, and is recessed between about 0.4 millimeters and about 0.8 millimeters, such as about 0.6 millimeters, from the outer circumferential surface 130 of the master link pin 106.

Referring to FIGS. 6, 8, 9, 11, and 12, the master retaining ring 107 is a disk-shaped seal having a cylindrical inner surface 146, a cylindrical outer surface 148, a distal surface 150, and a proximal surface 152. The inner and outer surfaces 146, 148 extend a distance between the distal and proximal surfaces 150, 152. The inner surface 146 of the master retaining ring 107 may be sized and shaped to be secured around the master link pin 106 in the distal annular groove 138.

When secured or otherwise disposed in the distal annular groove 138 of the master link pin 106, the master retaining ring 107 may extend out of the distal annular groove 138 such that the outer surface 148 of the master retaining ring 107 may extend beyond the outer circumferential surface 130 of the master link pin 106. The outer surface 148 of the master retaining ring 107 may have a diameter that is larger than the inner diameter of the pin bores 118 of the master links 102, 104. In such a configuration, once the master retaining ring 107 is disposed in the distal annular groove 138, the master retaining ring 107 may prevent the master link pin 106 from being retracted through the pin bore 118 of either master link 102, 104, depending on the side of insertion. The master retaining ring 107 may have a depth between the distal and proximal surfaces 150, 152 substantially equivalent to the width of the distal annular groove 138 along the outer circumferential surface 130. However, it will be appreciated that if the master retaining ring 107 has a depth less than the depth of the distal annular groove 138, one or more master retaining rings 107 may be disposed within the distal annular groove 138 to secure the master link pin 106 in the master link box 100.

In a preferred embodiment, the master retaining ring 107 is a triple wrap retaining ring which is a substantially straight piece of steel or other metal, such as tool steel or other resilient material, which is wrapped three times around the master link pin 106 in the distal annular groove 138. In such an embodiment, the master retaining ring 107 may be secured or disposed in the distal annular groove 138 of the master link pin 106 without the use of a press fit tool or other tool to enlarge and/or resize the master retaining ring 107. However, it will be appreciated that the master retaining ring 107 may have other designs. For example, the master retaining ring 107 may be a strip of steel which is wrapped one, two, or four or more times around the master link pin 106 or may be a solitary ring that is press-fit or sledged into the distal annular groove 138.

In the illustrated embodiment, the master retaining ring 107 has a diameter of the inside surface 146 of about 42.72 and an outer diameter between about 46.5 millimeters and about 47.5 millimeters, such as between about 46.86 millimeters and about 47.12 millimeters, such as about 46.99 millimeters. The master retaining ring 107 has a thickness between the distal surface 150 and the proximal surface 152 between about 2.95 millimeters and about 3.00 millimeters, such as between about 2.96 millimeters and about 2.98 millimeters, such as about 2.97 millimeters.

Figure 11:
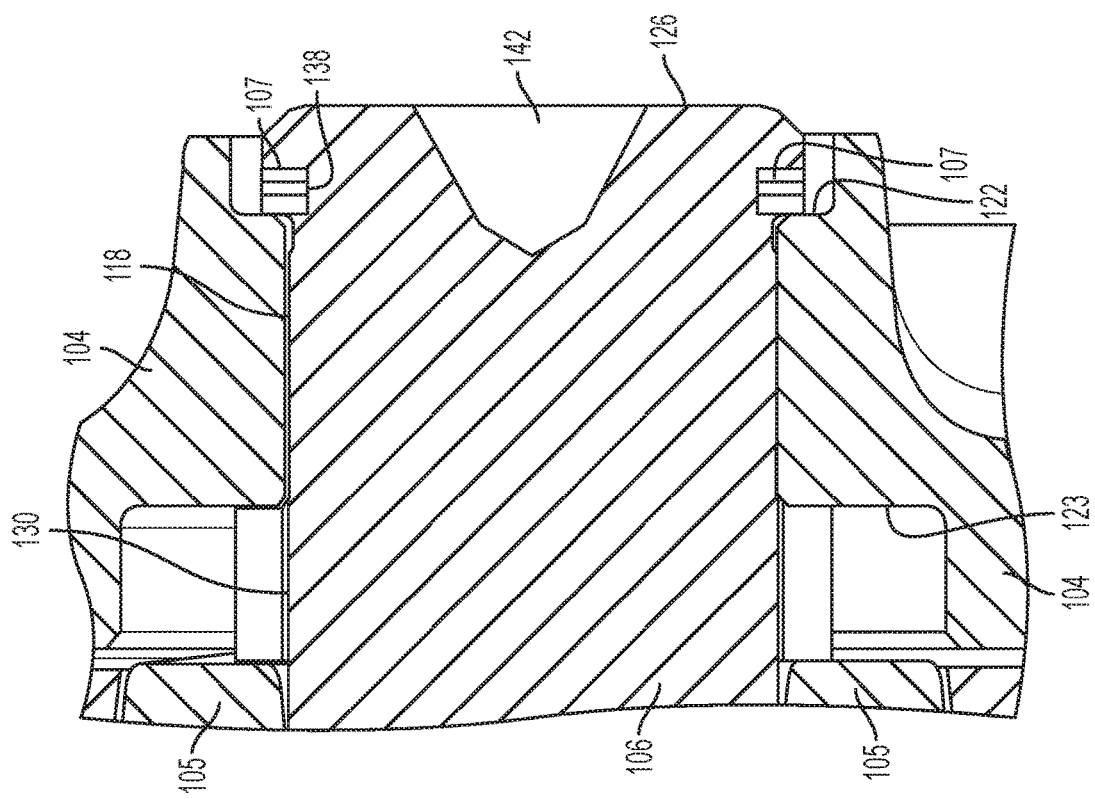
FIGS. 10 and 11 are enlarged cross-sectional views of portions of the master link box of FIG. 8.
Figure 12:
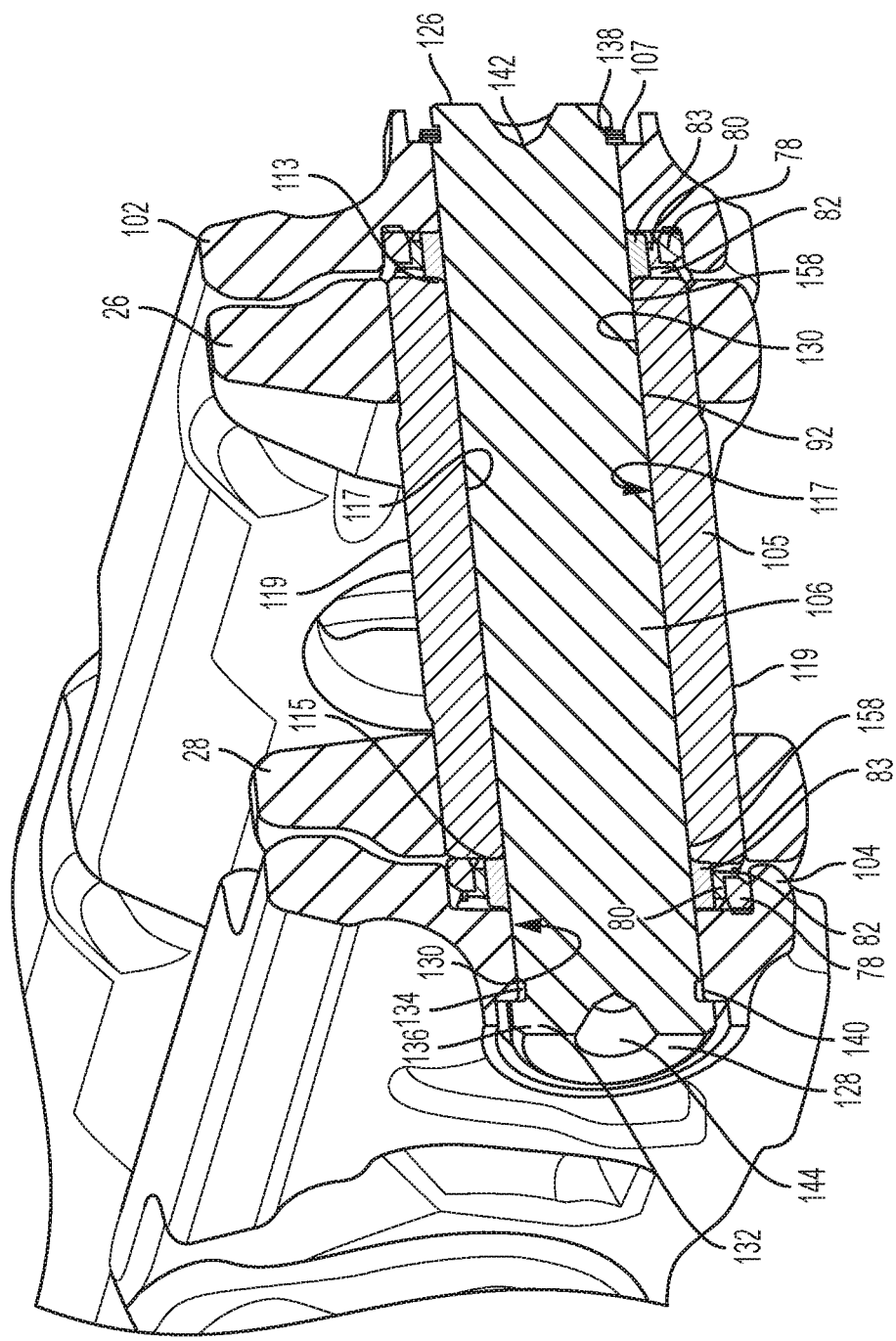
FIG. 12 is a perspective cross-sectional view of a cross-section of the master link box of FIG. 8 in joined to a link assembly.

As shown in FIGS. 11 and 12, the master link box 100 may also include one or more load rings 78, one or more seal rings 80 having a seal lip 82, and one or more thrust rings 83 disposed between the master link bushing 105 and the medial annular recesses 123 of the master links 102, 104. The load ring 78 may provide a thrust load or similar force onto the seal ring 80 which pushes or presses the seal lip 82 of the seal ring 80 against the ends of the master link bushing 105 to form a fluid seal between the master link bushing 105, the master links 102, 104, and the master link pin 106 when the master link pin 106 is secured in the master link box 100, as detailed below. The thrust rings 83 may separate the master link bushing 105 and the medial annular recess 123 of the master link 102, 104 to protect the load ring 78 and the seal ring 80. In a one embodiment, such as when the lubricant 92 is oil, the thrust ring 83 is made of a powdered metal, the load ring 78 is made of rubber, and the seal ring 80 is made of a polycarbonate material. In an alternative embodiment, such as when the lubricant is grease 92, the seal ring 80 is made of urethane. However, it will be appreciated that the thrust ring 83, load rings 78, and seal rings 80 may be made from tool steel, polycarbonate, or any other suitable material.

Referring to FIGS. 6-12, the master link box 100 may be secured between the front and rear 94, 96 ends of the link assembly 86 to form the continuous track 14.

In one embodiment, the second or link seal bore 120 of the master links 102, 104 are pre-joined onto the front end 94 of the link assembly 86. The second ends 110 of the master links 102, 104 may be connected with a bushing 30 by securing the link seal bores 120 of the master links 102, 104 around the cylindrical outer surface 62 of the bushing 30. The link seal bores 120 of the master links 102, 104 and the bushing 30 may then be disposed and aligned with the pin bores 44 of the track links 26, 28 defining the front end 94 of the link assembly 86. One or more load rings 78, one or more seal rings 80, and one or more thrust rings 83 may be disposed between the bushing 30, the medial annular recesses 77 of the track links 26, 28, and the master links 102, 104. Once the bores 120, 44 are aligned, a track link pin 32 may be inserted through the track links 26, 28 defining the front end 94 of the link assembly 86 and the bushing 30 secured between the master links 102, 104 to join the front end 94 of the link assembly 86, the bushing 30, and the master links 102, 104. The track link pin 32 may be inserted and the master links 102, 104 may be joined to the first ends 34 of the links 26, 28 of the front link box 24 of the link assembly 86 by any other suitable means. For example, the track link pin 32 may be press-fit and sealed within the pin bores 44 of the front links 26, 28, the bushing 30, and the link seal bores 120 of the master links 102, 104.

In a further embodiment, the master link bushing 105 may be pre-joined between the link seal bores 46 of the track links 26, 28 defining the rear end of the link assembly 86 and the first ends 108 of the master links 102, 104 are not pre-joined to the rear end 96 of the link assembly 86. The master link bushing 105 may be secured between the link seal bores 46 of the track links 26, 28 defining the rear end 96 of the link assembly 86 by press-fitting or any other suitable means. In such an embodiment, the link assembly 86 including the master link box 100 may be wrapped around the rotatable elements 16, 18, 20, 22 of the work machine 10 and the first ends 108 of the master links 102, 104 may be subsequently joined to the rear end 96 of the link assembly 86 when the track links 26, 28 and master links 102, 104 are in place and aligned to form the continuous track 14.

To join the master link box 100 between the front and rear ends 94, 96 of the link assembly 86 to form a continuous track 14, the link seal bores 120 of the master links 102, 104 may be secured to the front end 94 of the link assembly 86 by a track link pin 32, as described above, and the pin bores 118 of the master links 102, 104 may be aligned with the link seal bores 46 of the first and second track links 26, 28 of the rear end 96 of the link assembly 86 with the master link bushing 105 secured therebetween. The distal end 126 of the master link pin 106 is then inserted or otherwise fit through the pin bore 118 of the left-hand or right-hand master link 102, 104 from the distal surface 112, through the master link bushing 105 (which is disposed between the link seal bores 46 of the track links 26, 28), and through the pin bore 118 of the other master link 102, 104. The master link pin 106 is inserted through one of the master links 102, 104, through the master link bushing 105, and through the other master links 102, 104 until the projection surface 134 of the radial projection 132 of the master link pin 106 abuts the lateral annular recess 122 of the master link 102, 104 through which the distal end 126 of the master link pin 106 was first inserted.

As shown in FIG. 12, the master link box 100 may include one or more load rings 78, one or more seal rings 80, and one or more thrust rings 83 disposed between the medial annular recesses 123 of the master links 102, 104 and the master link bushing 105. The load rings 78, seal rings 80, and thrust rings 83 may be disposed such that the load ring 78 may provide a thrust load or similar force onto the seal ring 80 which pushes or presses the seal lip 82 of the seal ring 83 against the end of the master link bushing 105 to form a fluid seal between the master link bushing 105, the master links 102, 104, and the master link pin 106 when the master link pin 106 is secured in the master link box 100. The thrust ring 83 may separate the master link bushing 105 and the medial annular recess 123 of the master link 102, 104 to protect the load ring 78 and seal ring 80. As a result, when the master link pin 106 is inserted into the master link box 100, a sealed link cavity 158 is formed between the cylindrical inner surface 60 of the master link bushing 105, the outer circumferential surface 130 of the master link pin 106, the load rings 78, the seal rings 80, the thrust rings 83, and the medial annular recess 123 and/or the pin bore 118 of the master links 102, 104.

While the master link box 100 has been described as having load rings 78, seal rings 80, and thrust rings 83 which form the sealed link cavity 158, it will be appreciated that other seals, rings, and seal rings or combinations thereof may be used to form the sealed link cavity 158. For example, the master link box 100 may include a thrust ring and an oil seal, such as when the master link pin 106 includes a longitudinal bore 160, a grease seal, such as when the master link pin 106 does not have a longitudinal bore 160, or any other suitable seals, rings, or seal rings, or any combination thereof.

The master link box 100 may also include lubricant 92 in the sealed link cavity 158. The lubricant 92 may facilitate the rotation of the master link pin 106 within the master link bushing 105, reduce friction and/or wear of the master link bushing 105 and/or master link pin 106, and reduce heat generation. In a first exemplary embodiment, before the master link pin 106 has been fully inserted into the master link box 100, the lubricant 92 may be inserted into the sealed link cavity 90 and/or in the master link bushing 105. As such, when the master link pin 106 is fully inserted in the master link box 100, the lubricant 92 will be fluidly sealed within the sealed link cavity 158 of the master link box 100.

In second exemplary embodiment, such as when the lubricant 92 is oil and the master link pin 106 includes a longitudinal bore 160, a side fluid passage 162, and a cap 164, the lubricant 92 may be added through the longitudinal bore 160 of the master link pin 106, through the side fluid passage 162, and into the sealed link cavity 158 of the master link box 100. In such an embodiment, the lubricant 92 may be added at any time during the assembly of the master link box 100, such as after the master link pin 106 has been fully inserted in the master link box 100, as detailed below. After sufficient lubricant 92 has been added into the sealed link cavity 158 of the master link box 100, the cap 164 may be inserted into the longitudinal bore 160 to seal the longitudinal bore 160 and thereby retain the lubricant 92 in the sealed link cavity 158.

When the master link pin 106 has been fit through the pin bore 118 of the left-hand or right-hand master link 102, 104, the master link bushing 105, and through the pin bore 118 of the other master link 102, 104 until the radial projection 132 of the master link pin 106 abut the lateral annular recess 122 of the master link 102, 104 through which the master link pin 106 was first inserted, the distal annular groove 138 will be disposed on the distal side of the pin bore 118 of the master link 102, 104 through which the master link pin 106 was inserted second (the right-hand master link 104 in FIG. 8-9 and the left-hand master link 102 in FIG. 12). The master retaining ring 107 may then be secured or otherwise fit in the distal annular groove 138 of the master link pin 106. In a preferred embodiment, the master retaining ring 107 is wrapped three times around the maser link pin 106 until the master retaining ring 107 is secured in the distal annular groove 138. The master link pin 106 may then be secured in the master link box 100 and the master link pin 106 may rotate within the master link bushing 105, the pin bores 118 of the master links 102, 104, and the link seal bores 46 of the track links 26, 28.

The master link pin 106 may be inserted into the master link box 100 from either side. For example, the master link pin 106 may be inserted first through the left-hand master link 102, then through the master link bushing 105, and subsequently through the right-hand master link 104 (FIGS. 8-9) or the master link pin 106 may be inserted through the right-hand master link 104, then through the master link bushing 105, and subsequently through the left-hand master link 102 (FIG. 12). When inserted from either direction, the distal annular groove 138 will be disposed on the distal side of the lateral annular recess 122 of the master link 102, 104 through which the distal end 126 of the master link pin 106 was inserted second, and the master retaining ring 107 may be secured or otherwise retained in the distal annular groove 138 of the master link pin 106. As such, the master link pin 106 may be inserted into the master link box 100 from either direction and then secured in the master link box 100 by the master retaining ring 107, thereby allowing a user to join the master link box 100 to the front and rear ends 94, 96 of the link assembly 86. In such a manner, the continuous track 14 may be secured on the work machine 10 from either the outside of the work machine 10 or inside of the work machine 10 for either the left or right continuous track 14.

INDUSTRIAL APPLICABILITY

The disclosed master link box 100 may be integrated with tracks 14 of many work machines 10 where durability of the track 14 is required including, but not limited to, a track-type tractor, a half-track machine, an excavator, a tank, some other type of mobile machine, or even a stationary machine such as a conveyor. By incorporating the disclosed master link box 100 of the present disclosure, the durability of the continuous tracks 14 may be improved and the continuous tracks 14 may be repaired or replaced less frequently. Further, when the master link box 100 is included at the front and rear ends 94, 96 of a link assembly 86, the ends 94, 96 of the link assembly 86 may be joined together to form a continuous track 14 without the use of a hydraulic press or other complicated and/or relatively immovable tool. Moreover, where the master link box 100 is employed, the continuous track 14 may be secured around the rotatable elements 16, 18, 20, 22 of the work machine 10 from either the outside or inside of work machine 10 for either the left or right continuous track 14.

The master link box 100 includes first and second master links 102, 104 having pin bores 118 and lateral annular recesses 122, a master link bushing 105, and a master link pin 106 having a distal annular groove 138 disposed near the distal end 126 and a radial projection 132 disposed near the proximal end 128. When the master link pin 106 is inserted into the master link box 100 through the pin bore 118 of one of the master links 102, 104, through the master link bushing 105, and through the pin bore 118 of the other master link 102, 104, the projection surface 134 of the radial projection 132 of the master link pin 106 will abut the lateral annular recess 122 of the master link 102, 104 through which the master link pin 106 was first inserted when the master link pin 106 is in the proper position and will thereby prevent the master link pin 106 from being inserted too far through the pin bores 118. The master link pin 106 may be easily aligned with and inserted into the master link box 100 without the use of expensive and/or relatively immovable alignment or fitting tools. The master link pin 106 does not need to be re-adjusted afterward.

The master link box 100 also includes a master retaining ring 107 which securely fits in the distal annular groove 138 of the master link pin 106 and is larger than the pin bores 118 of the master links 102, 104. When the master link pin 106 is fully inserted in the master link box 100 and the master retaining ring 107 is secured in the distal annular groove 138, the master link pin 106 is secured in the master link box 100 and will not retract out of the master link box 100. The master retaining ring 107 may be a triple wrap retaining ring which is wrapped three times around the master link pin 106 in the distal annular groove 138. As such, the master retaining ring 107 may easily be secured in the distal annular groove 138 without the use of expensive and/or otherwise immovable fitting tools and the master retaining ring 107 may be secured on the master link pin 106 without re-positioning the master link pin 106 in the master link box 100.

The master link pin 106 may join the master links 102, 104 to the bushing 30 disposed between two track links 26, 28, such that the master link box 100 connects the front and rear ends 94, 96 of the link assembly 86 to form the continuous track 14. The master link pin 106 is secured in the master link box 100 via the abutment between the radial projection 132 of the master link pin 106 and the lateral annular recess 122 of one of the master links 102, 104 and the abutment between the master retaining ring 107 and the lateral annular recess 122 of the other master link 102, 104. As such, the master link pin 106 is not rotationally fixed within either of the pin bores 118 of the master links 102, 104 or the master link bushing 105. Accordingly, as the continuous track 14 rotates around the rotatable elements 16, 18, 20, 22 of the work machine 10, the track links 26, 28 and master links 102, 104 may pivot about the master link pin 106, resulting in a smoother ride for the work machine 10.

Because the master link pin 106 may be inserted first through the either the left-hand or right-hand master link 102, 104, through the remainder of the master link box 100, and then secured by the master retaining ring 107, the master link box 100 may be assembled from either the outside or inside of the track 14. This ability to assemble the master link box 100 from either side of the track 14 makes the assembly of the link assembly 86 into the continuous track 14 easier, particularly as assembly or reassembly of the track 14 in the field may be required with the master link box 100 at various positions on the track 14.

In view of the many possible embodiments to which the principles of the disclosure can be applied, it should be recognized that the illustrated embodiments are only preferred examples and should not be taken as limiting the scope of the disclosure. Rather the scope of the disclosure is defined by the following claims.

It will be appreciated that the foregoing description provides examples of the disclosed apparatus and system. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

LIST OF ELEMENTS
TITLE: FLANGED MASTER TRACK PIN WITH RETAINING RING
FILE: 18-0191-67748 (37495.04036)

| Number | Element |
|---|---|
| 10 | Work machine |
| 12 | Frame |
| 14 | Track |
| 16 | Drive sprocket |
| 18 | Back idler |
| 20 | Front idler |
| 22 | Track rollers |
| 24 | Track link boxes |
| 26 | First or left-hand track links |
| 28 | Second or right-hand track links |
| 30 | Bushing |
| 32 | Track link pin |
| 34 | First end (track link) |
| 36 | Second end (track link) |
| 38 | Distal surface (track link) |
| 40 | Proximal surface (track link) |
| 42 | Top surface (track link) |
| 44 | Pin bore (track link) |
| 46 | Link seal bore (track link) |
| 50 | Track shoe bores (track link) |
| 52 | Track shoe fastener |
| 54 | Track shoe |
| 56 | First opening (bushing) |
| 58 | Second opening (bushing) |
| 60 | Inner surface (bushing) |
| 62 | Outer surface (bushing) |
| 64 | Distal end (track link pin) |
| 66 | Proximal end (track link pin) |
| 68 | Outer circumferential surface (track link pin) |
| 70 | Radial projection (track link pin) |
| 72 | Projection surface (radial projection) |
| 74 | Radial outer surface (radial projection) |
| 75 | Annular groove |
| 76 | Lateral annular recess (track links) |
| 77 | Medial annular recess (track links) |
| 78 | Load ring |
| 79 | Longitudinal bore (track link pin) |
| 80 | Seal ring |
| 81 | Side fluid passage (track link pin) |
| 82 | Seal lip |
| 83 | Thrust ring |
| 84 | First counterbore (track link pin) |
| 85 | Cap (track link pin) |
| 86 | Link assembly |
| 87 | Second Counterbore |
| 88 | Retaining ring |
| 90 | Sealed link cavity |
| 92 | Oil/grease |
| 94 | Front end (of link assembly) |
| 96 | Rear end (of link assembly) |
| 100 | Master link box |
| 102 | Left-hand master link |
| 104 | Right-hand master link |
| 105 | Master link bushing |
| 106 | Master link pin |
| 107 | Master retaining ring |
| 108 | First end (master link) |
| 110 | Second end (master link) |
| 112 | Distal surface (master link) |
| 113 | First opening (master link bushing) |
| 114 | Proximal surface (master link) |
| 115 | Second opening (master link bushing) |
| 116 | Top surface (master link) |
| 117 | Cylindrical inner surface (master link bushing) |
| 118 | Pin bore (master link) |
| 119 | Cylindrical outer surface (master link bushing) |
| 120 | Link seal bore (master link) |
| 122 | Lateral annular recess (master link) |
| 123 | Medial annular recess (master link) |
| 124 | Track shoe bores (master link) |
| 126 | Distal end (master link pin) |
| 128 | Proximal end (master link pin) |
| 130 | Outer circumferential surface (master link pin) |
| 132 | Radial projection (master link pin) |
| 134 | Projection surface (master link pin) |
| 136 | Radial outer surface (master link pin) |
| 138 | Distal annular groove (master link pin) |
| 140 | Proximal annular groove (master link pin) |

-continued

LIST OF ELEMENTS
TITLE: FLANGED MASTER TRACK PIN WITH RETAINING RING
FILE: 18-0191-67748 (37495.04036)

| Number | Element |
|---|---|
| 142 | Distal counterbore |
| 144 | Proximal counterbore |
| 146 | Inner surface (retaining ring) |
| 148 | Outer surface (retaining ring) |
| 150 | Distal surface (retaining ring) |
| 152 | Proximal surface (retaining ring) |
| 158 | Sealed link cavity |
| 160 | Longitudinal bore (master link pin) |
| 162 | Side fluid passage (master link pin) |
| 164 | Cap (master link pin) |

What is claimed is:

1. A master link box for a continuous track of a work machine, the master link box comprising:
 a left-hand master link having a first distal surface, a first proximal surface opposite the first distal surface, a first pin bore extending between the first distal surface and the first proximal surface, a first link seal bore, and a first lateral annular recess disposed around the first pin bore and inset from the first distal surface;
 a right-hand master link having a second distal surface, a second proximal surface opposite the second distal surface, a second pin bore extending between the second distal surface and the second proximal surface, a second link seal bore, and a second lateral annular recess disposed around the second pin bore and inset from the second distal surface;
 a master link pin having a distal end, a proximal end opposite the distal end, an outer circumferential surface, a distal annular groove in the outer circumferential surface near the distal end, and a radial flange near the proximal end; and
 a master retaining ring disposed in the distal annular groove of the master link pin;
 wherein the first lateral annular recess and the second lateral annular recess are both configured to receive the radial flange; and
 wherein the master link box can be assembled both by first inserting the master link pin through the left-hand master link such that the radial flange abuts the first lateral annular recess and the distal annular groove is disposed distally beyond the second distal surface and by first inserting the master link pin through the right-hand master link such that the radial flange abuts the second lateral annular recess and the distal annular groove is disposed distally beyond the first distal surface.

2. The master link box of claim 1, wherein the master retaining ring has an outer surface with a diameter that is larger than an inner diameter of the first pin bore and an inner diameter of the second pin bore.

3. The master link box of claim 1, wherein the master retaining ring is a triple wrap retaining ring.

4. The master link box of claim 1, wherein the master link pin further comprises a longitudinal bore extending longitudinally into the master link pin from the distal end and a side fluid passage extending radially outward from the longitudinal bore to the outer circumferential surface.

5. The master link box of claim 4, further comprising a cap inserted into the longitudinal bore from the distal end to seal the longitudinal bore from the distal end.

6. The master link box of claim 1, wherein the master link pin further comprises a proximal annular groove disposed in and extending circumferentially around the outer circumferential surface near the proximal end.

7. The master link box of claim 6, wherein a wall of the proximal annular groove is coextensive with the radial flange.

8. The master link box of claim 1, wherein the outer circumferential surface of the master link pin has a diameter at a location between the distal annular groove and the distal end that is smaller than a diameter of the outer circumferential surface at a location between the distal annular groove and the radial flange.

9. The master link box of claim 1, wherein the first lateral annular recess is a mirror image of the second lateral annular recess.

10. A master link box for use in a continuous track of a work machine, the master link box comprising:
 a left-hand master link having a first distal surface, a first proximal surface opposite the first distal surface, a first pin bore extending between the first distal surface and the first proximal surface, a first link seal bore, and a first lateral annular recess disposed around the first pin bore and inset from the first distal surface;
 a right-hand master link having a second distal surface, a second proximal surface opposite the second distal surface, a second pin bore extending between the second distal surface and the second proximal surface, a second link seal bore, and a second lateral annular recess disposed around the second pin bore and inset from the second distal surface;
 a master link pin receivable in the first pin bore and the second pin bore, the master link pin comprising:
  a distal end;
  a proximal end opposite the distal end;
  an outer circumferential surface;
  a distal annular groove in the outer circumferential surface near the distal end; and
  a radial projection near the proximal end having a projection surface extending outwardly from the outer circumferential surface; and
 a master retaining ring disposed in the distal annular groove;
 wherein the first lateral annular recess and the second lateral annular recess are both configured to receive the radial projection; and
 wherein the master link box can be assembled both by first inserting the master link pin through the left-hand master link such that the radial projection is received in the first lateral annular recess and by first inserting the master link pin through the right-hand master link such that the radial projection is received in the second lateral annular recess, and subsequently secured in place by the master retaining ring.

11. The master link box of claim 10, wherein the master link pin is rotationally free within the master link box.

12. The master link box of claim 10, wherein the projection surface extends perpendicularly to the outer circumferential surface.

13. The master link box of claim 10, wherein the projection surface abuts one of the first lateral annular recess and the second lateral annular recess when the master link box is assembled.

14. The master link box of claim 13, wherein the distal annular groove is disposed distally beyond one of the first distal surface and the second distal surface.

15. The master link box of claim 10, wherein the master retaining ring is a triple wrap retaining ring.

16. The master link box of claim 10, wherein the master retaining ring is configured to prevent the master link pin from retracting through the left-hand and the right-hand master links when the master retaining ring is disposed in the distal annular groove.

17. A method for forming a continuous track for a work machine, the method comprising:
providing a plurality of track link boxes forming a link assembly having a first end and a second end;
providing a master link box between the front end and the rear end of the link assembly, the master link box comprising:
a left-hand master link having a first pin bore, a first lateral annular recess disposed around the first pin bore and a first link seal bore;
a right-hand master link having a second pin bore, a second lateral annular recess disposed around the second pin bore, and a second link seal bore;
a master link bushing;
a master link pin having a distal annular groove near a distal end and a radial projection near a proximal end; and
a master retaining ring;
securing the first link seal bore and the second link seal bore to the first end of the link assembly;
securing the master link bushing between two link seal bores of a track link box defining the second end of the link assembly;
aligning the first pin bore and the second pin bore with the master link bushing;
inserting the master link pin through one of the first pin bore and the second pin bore, through the master link bushing, and into the other of the first pin bore and second pin bore; and
securing the master retaining ring in the distal annular groove of the master link pin;
wherein the master link box is configured to be assembled both by first inserting the master link pin through the first pin bore such that the radial projection abuts the first lateral annular recess and by first inserting the master link pin through the second pin bore such that the radial projection abuts the second lateral annular recess.

18. The method of claim 17, wherein the master retaining ring is secured in the distal annular groove by wrapping the master retaining ring around the distal annular groove of the master link pin.

19. The method of claim 17, wherein the master link pin further comprises a proximal, circumferentially-extending, annular groove near the proximal end.

20. The method of claim 17, wherein the first lateral annular recess is a mirror image of the second lateral annular recess.

* * * * *